United States Patent

Ishihara et al.

Patent Number: 5,113,594
Date of Patent: May 19, 1992

[54] OIL LEVEL GAUGE

[75] Inventors: Yoshimi Ishihara, Anjo; Kazutaka Otsubo, Okazaki, both of Japan

[73] Assignee: Aisin AW Co., Ltd., Japan

[21] Appl. No.: 693,308

[22] Filed: May 1, 1991

[30] Foreign Application Priority Data

May 2, 1990 [JP] Japan .................. 2-116382

[51] Int. Cl.$^5$ .................. G01F 23/04
[52] U.S. Cl. .................. 33/722; 33/726; 33/728; 33/730
[58] Field of Search .............. 33/721, 722, 723, 724, 33/726, 728, 729, 730, 731; 116/227

[56] References Cited

U.S. PATENT DOCUMENTS

| 2,443,294 | 6/1948 | Bickle | 353/722 |
| 2,550,897 | 5/1951 | Wilson | 353/729 |
| 2,738,587 | 3/1956 | Nelson | 353/728 |
| 2,756,716 | 7/1956 | Petrossian | 353/722 |
| 2,782,514 | 2/1957 | Scott et al. | 353/722 |
| 4,761,886 | 8/1988 | Wilson et al. | 353/722 |

Primary Examiner—William A. Cuchlinski, Jr.
Assistant Examiner—William C. Dowling
Attorney, Agent, or Firm—Lorusso & Loud

[57] ABSTRACT

There is disclosed a short and straight oil level gauge adapted for use with an automative automatic transmission. The gauge is inserted in an oil filler tube which is also short and straight. The tube has a flexible clamping member. The gauge has a rodlike body having two ribs, a cover at the upper end of the rodlike body, a plug portion located under the cover, a tool-connecting portion located above the cover, and insertion guide surfaces formed on the body and connecting the plug portion with the body. The tool-connecting portion is shaped like a socket, and a conventional socket wrench can be inserted into this tool-connecting portion. The insertion guide surfaces are formed by two ribs or fins radially extending from the rodlike body in mutually perpendicular directions. The guide surfaces cooperate with the inner surface of the tube to assure that the clamping member of the tube engages the cover.

8 Claims, 7 Drawing Sheets

OIL LEVEL GAUGE

FIELD OF THE INVENTION

The present invention relates to an oil level gauge (dipstick or oil-level indicator) and, more particularly, to an oil level gauge adapted for use with an automotive automatic transmission.

BACKGROUND OF THE INVENTION

An oil level gauge, or dipstick, is used to determine the level of the oil in the oil pan of an automobile. The oil level is determined by withdrawing the dipstick and noting how high the oil has risen on the dipstick. The gauge is inserted and held in an oil filler tube equipped with a flexible clamping member. This clamping member is made to engage a cover on the gauge to prevent the gauge from coming out of the filler tube. When the oil level is to be measured, the gauge is withdrawn from the filler tube. To accomplish this, the clamping member is disingaged from the cover of the gauge with the tip of a finger or the like. The finger then engages the hook at the top of the gauge, and the gauge is withdrawn.

In the case of an oil level gauge adapted for use with an automotive automatic transmission, the engine and the accessory parts are closely spaced. Therefore, it is difficult to insert a finger between the engine and the accessory parts. To permit the above-described manipulations, it is necessary to maintain the position of the clamping member high. Thus, it is necessary that a long filler tube extend upward from the oil pan located at the lowermost position in the transmission and that the tube must be bent in three dimensions to prevent it from interfering with the automotive body or other device. An oil level gauge inserted into the filler tube must have a length equal to the length of the vertical portion of the filler tube. Furthermore, the gauge must be made of a flexible spring steel and be twisted in a complicated manner to bend in conformity to the bend of the filler tube.

Various gauges have been made, taking into account the foregoing problems and the difficulty of machining the filler tube, to adapt the oil level gauge to automobiles with automatic transmissions and to various engine designs. As an example, a known oil level gauge is used with a filler tube divided into a lower tube and an upper tube. To enable the gauge to be installed in any of various automobiles, only the shape of the upper tube is modified.

With the known oil level gauge described just above, the filler tube is bent over a long distance in three dimensions and so the gauge inserted into the tube is also long. In addition, the gauge must be flexible enough to adapt itself to the three-dimensional bend of the tube. In this way, the gauge is wasteful in configuration. Similarly, the filler tube must be made much longer than needed to provide the necessary function. Further, it is not always easy to withdraw the gauge.

Meanwhile, it is important that the cover of the gauge be positively clamped against the open end of the filler tube. If the clamp is not secured, then foreign matter such as rainwater or dust may enter from the gap around the gauge cover and mix with the oil. As a result, a valve in the automatic transmission may stick. Consequently, the clamping position cannot be altered without a reliable clamping means. For these reasons, reductions in the lengths of the gauge and the filler tube have not been accomplished. Also, it has been impossible to straighten them, for the reasons stated.

SUMMARY OF THE INVENTION

It is an object of the invention to provide an oil level gauge for use with an oil filler tube equipped with a clamping member than can be remotely operated when the position of the clamping member is lowered, without deteriorating reliability, thus permitting the oil level gauge and the filler tube to be shortened, straightened, and simplified in structure, the gauge being further characterized in that it can be withdrawn easily.

The above object is achieved by an oil level gauge whose body is inserted in an oil filler tube equipped with a flexible clamping member, the gauge having a cover which the clamping member engages to hold the gauge in the tube, the cover having a tool-connecting portion into which the front end of a tool can be fitted so as to be withdrawable, the gauge being provided with insertion guide surfaces located below the cover, the insertion guide surfaces cooperating with the inner surfaces of the filler tube.

In the oil level gauge built as described above, the body of the gauge is inserted into the oil filler tube while the tool-connecting portion is connected with the front end of the tool. At this time, the insertion guide surfaces cooperate with the inner surface of the oil filler tube to position the center of the cover. This assures that the flexible clamping member attached to the filler tube properly engages the cover. Therefore, it is possible to operate the clamping member remotely. Furthermore, the gauge can be withdrawn easily. These features are combined to permit the gauge and the filler tube to be shortened and straightened. Other objects and features of the invention will appear in the course of the description thereof which follows.

DETAILED DESCRIPTION OF THE INVENTION

Figure 1A:
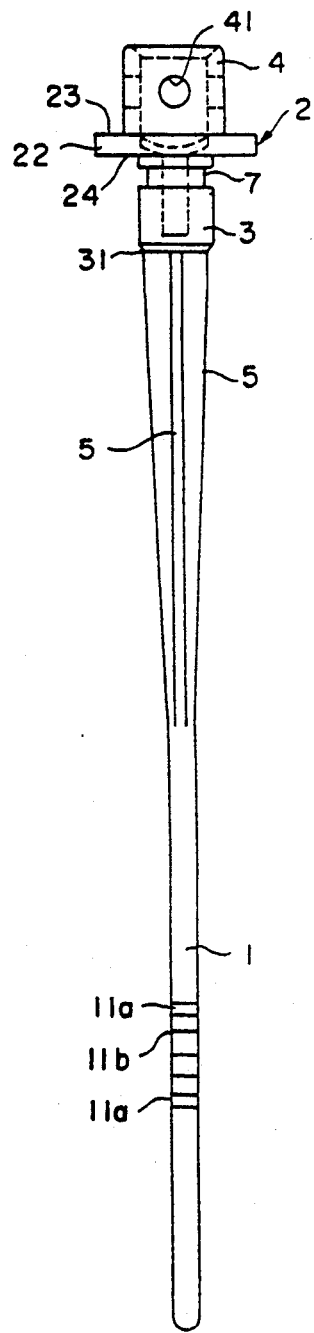
FIG. 1(a) is a front elevation of an oil level gauge according to the invention.

Referring to FIG. 1(a)-(d), there is shown an oil level gauge according to the invention. The body of this gauge is indicated by reference numeral 1. As shown in FIG. 1(a) and (d), the gauge includes a cover 2, a plug portion 3 located below the cover 2 and connected with the cover, a tool-connecting portion 4 located over the cover 2 and integral with the cover, as well as the body 1. Insertion guide surfaces 5 are formed below the plug portion 3 to connect the plug portion 3 with the body 1 via a chamfered portion 31.

Figure 2:
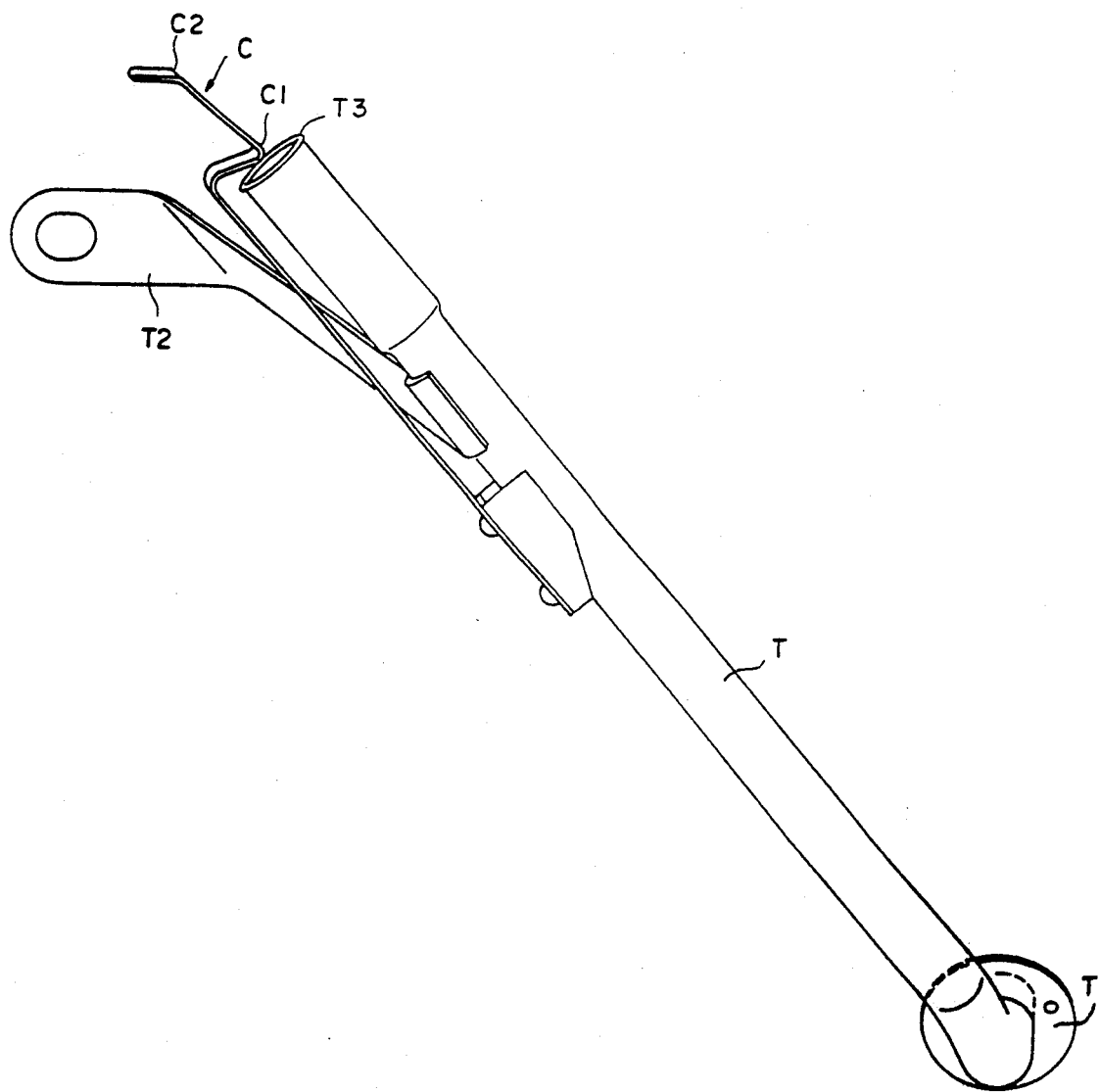
FIG. 2 is a perspective view of an oil filler tube, showing the manner in which the gauge shown in FIG. 1(a)–(c) is actually mounted into the filler tube.

FIG. 2 is a side elevation of a filler tube in which the oil level gauge constructed as described above is inserted and held, for showing the position of the tube when it is mounted in place. The filler tube, indicated by T, has a flange T1 at its lower end. This flange T1 is connected with an oil pan (not shown). A bracket T2 is rigidly mounted to the tube T at a location close o to its upper end. The tube T is held to the body of an automatic transmission via the bracket T2. A clamping member C is mounted to the vertical portion of the tube T via a bracket at a relatively high position.

Referring back to FIG. 1(a)-(d), the body 1 of the gauge is made of a resin and takes the form of a rod. Larger protrusions 11a and smaller protrusions 11b of semicircular cross section are formed on the front and rear surfaces of the gauge body 1 to indicate the oil level. The plug portion 3 consists of a cylinder whose diameter is somewhat smaller than the inside diameter of the filler tube T. The plug portion 3 is provided with a circumferential groove 7 in which an 0 ring 6 is fitted to seal the interface between the inner surface of the tube T and the outer surface of the plug portion 3.

Figure 1B:
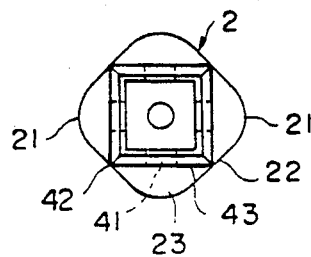
FIG. 1(b) is a top view of the oil level gauge shown in FIG. 1(a)
Figure 1C:
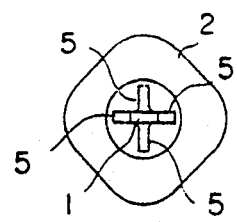
FIG. 1(c) is a bottom view of the oil level gauge shown in FIG. 1(a)
Figure 1D:
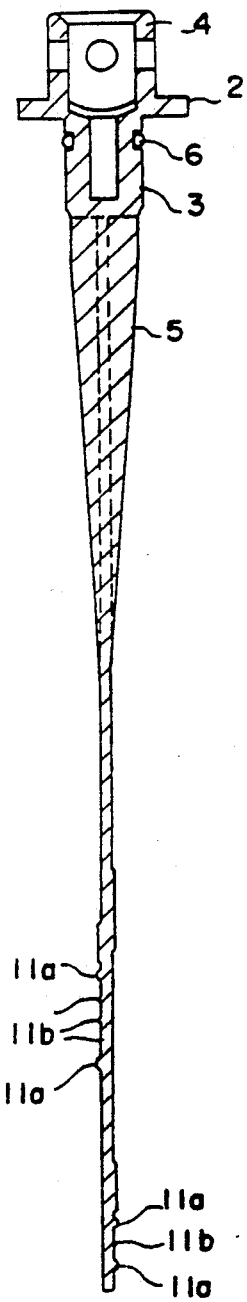
FIG. 1(d) is a vertical cross section taken through the center of the oil level gauge shown in FIG. 1(a)

As shown in FIG. 1(b), the cover 2 is a generally rectangular plate whose corners 21 are chamfered. The top surface 23 forms an engaging surface which is engaged by the clamping member C. The lower surface 24 engages the lip T3 of the opening at the upper end of the tube T, and thereby serves as a stopper that length of the gauge 1 inserted into the tube T remains constant.

A tool-connecting portion 4, into which the front end of a tool is received for withdrawal as described later in detail, is formed over the cover 2. This connecting portion 4 is a hollow rectangular box with an open upper end. The connecting portion 4 thus forms a socket into which the front end of the tool can be inserted from above. The outer surface of the connecting portion 4 forms a cam surface that disengages the clamping member C. The four walls of the connecting portion 4 are each provided with an engaging hole 41. In this example, the corners 21 of the cover 2 form an angle of 45° to the corners 42 of the socket and so the corners 42 of the socket lie just at the centers of the sides 22 of the cover 2.

As shown in FIG 1(a) and (c), ribs are formed below the cover 2 and extend axially of the gauge so as to connect the plug portion 3 which the body 1 of the gauge via the chamfered portion 31. The height of the ribs increases upwardly. The outer side surfaces of the ribs form insertion guide surfaces 5 which make sliding contact with the inner surface of the filler tube T and the clamping member C. One of the ribs extends longitudinally of the gauge and gradually increases the width of the body 1 of the gauge up to the bottom of the chamfered portion 31. The other rib also extends longitudinally of the gauge but protrudes horizontally at right angles to the former rib.

Referring next to FIG. 2, one end of the clamping member C is mounted to the outer surface of the filler tube T via a bracket. The other end of the clamping member C is a free end. This member C extends upwardly parallel to the filler tube T from its fixed one end, is bent through an acute angle toward the axis of the tube T near the lip T3 of the opening at the upper end of the tube T, extends to the proximity of the axis, is bent back away from the tube T, and is bent through an acute angle away from the axis.

Figure 3A:
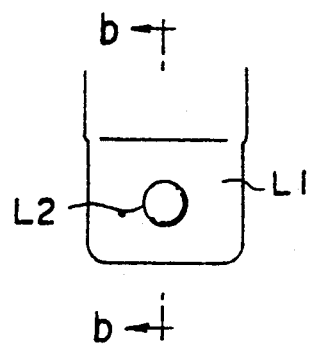
FIG. 3(a) is a front elevation of the front end portion of a tool.
Figure 3B:
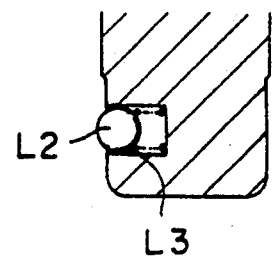
FIG. 3(b) is a vertical cross section taken through the center of the front end portion shown in FIG. 3(a)
Figure 3C:
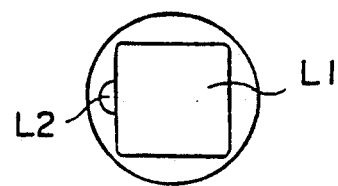
FIG. 3(c) is a bottom view of the front end portion shown in FIG. 3(a)
Figure 4A:
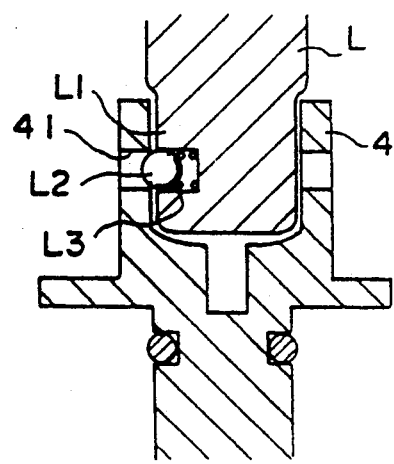
FIG. 4(a) and (b) are a cross sectional view and a side elevation, respectively, of the oil level gauge shown in FIG. 1(a)–(d) and the oil filler tube shown in FIG. 2, showing the sequence in which the gauge is inserted into or withdrawn from the filler tube.

The gauge configured as described above is inserted into and withdrawn from the filler tube in the manner now described. The sequence in which operations for the insertion or withdrawal are carried out is illustrated in FIG. 4(a) and (b). First, as shown in FIG. 4(a), the front end of the tool L is inserted into the tool-connecting portion 4. This tool is similar to an ordinary socket wrench. As shown in FIG. 3(a)-(c), a rectangular shaft portion L1 is formed at the front end of the tool L. A ball L2 capable of being engaged in any one of the engaging holes 41 in the socket is held in the rectangular shaft portion L1 and biased outwardly by the resilient force of a spring L3. Accordingly, when the rectangular shaft portion L1 at the front end of the tool L is forced into the tool-connecting portion 4 of the gauge as shown in FIG. 4 (a), the ball L2 is forced into the hole inside the rectangular shaft portion L1 while bearing on the inner surface of the wall of the socket against the resilient force of the spring L3 until the ball L2 reaches any one of the engaging holes 41, whereupon the biasing of the ball L2 permits the tool-connecting portion 4 of the gauge to hold the rectangular shaft portion L1 at the front end of the tool L with a given force.

Figure 4B:
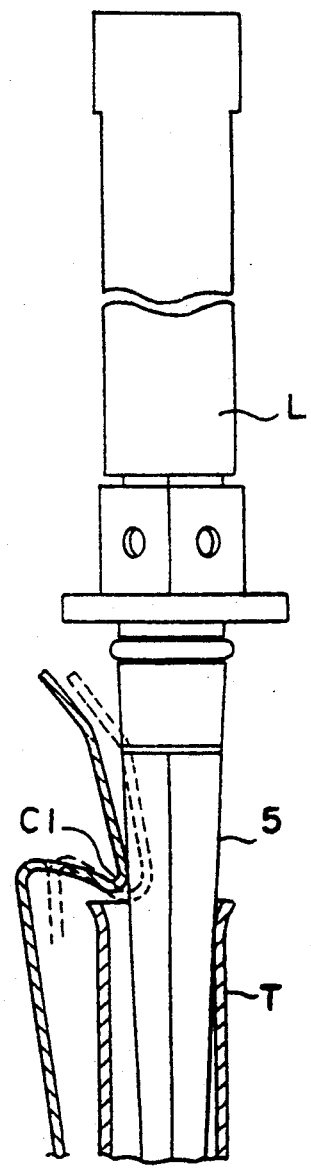

After the gauge has been connected to the front end of the tool L in this way, the gauge is inserted into the filler tube T as shown in FIG. 4(b). As the gauge is inserted to a given extent, the insertion guide surfaces 5 of the ribs come into engagement with the engaging point C1 of the clamping member C. The clamping member C is deformed as indicated by the solid lines. The original shape of the clamping member C is indicated by the broken lines.

Figure 4C:
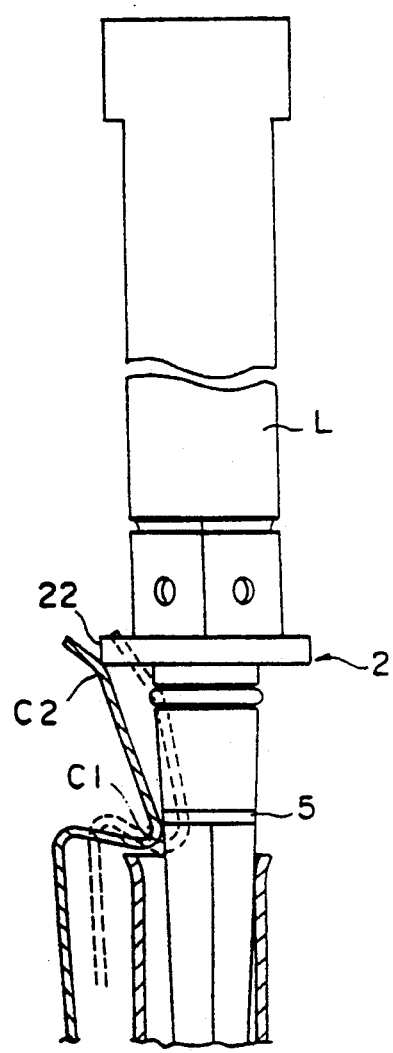
Figure 4D:
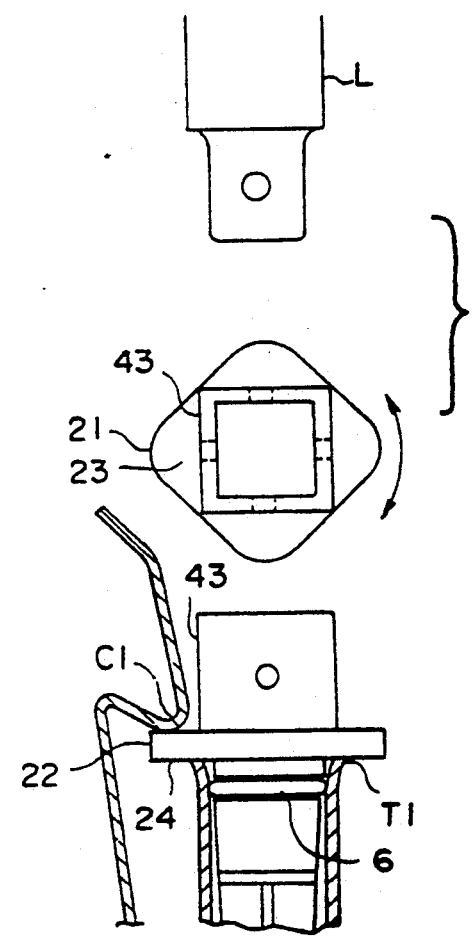

When the deformation progresses to the point where the condition shown in FIG. 4(c) is reached, the center of the cover 2 is gradually positioned by the guiding action of the insertion guide surfaces 5 formed by the ribs. At the same time, one side 22 of the cover 2 makes sliding contact with the engaging point C2. As the gauge enters the tube, the contact point moves from the engaging point C2 to the engaging point C1. Simultaneously, the free end of the clamping member C is urged further outward. When the lower surface 24 of the cover 2 bears again the lip T1 of the opening at the upper end, the centering is completed. The interface between the inner surface of the opening in the filler tube and the plug portion 3 of the gauge is fully sealed by the 0-ring 6. Concurrently, the side 22 passes over the engaging point C1. In this manner, the tool is rotated through 45°. As shown in FIG. 4(d), the rotation of the gauge rotates the socket, so that another side 43 of the socket comes into contact with the engaging point C1. The clamping member C then returns slightly inwardly. The corner 21 of the cover 2 is brought under the engaging point C1. The engaging point C1 is pressed against the upper surface 23 of the corner 21, whereby the tool and the gauge are clamped together. In this state, if the tool L is pulled upward, then the clamping force overcomes the connecting force of the spring L3 and, therefore, the tool L is disconnected from the gauge. The tool L is recovered, while the gauge is retained inside the filler tube T.

When the oil level should be checked, the gauge is withdrawn in the manner described below. First, the tool L is fitted into the tool-connecting portion 4 of the gauge. Then, the tool is rotated through 45° to thereby unclamp the gauge. Then, the gauge can be withdrawn by pulling it upwardly. During this operation, the clamping member C moves in a sequence substantially the opposite of the foregoing.

Figure 5:
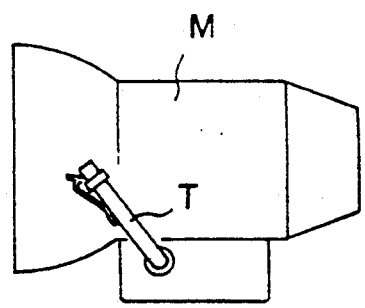
FIG. 5 is a side elevation of the gauge shown in FIG. 1(a)–(d), showing the manner in which the gauge is disposed.

In the above example, the gauge can be inserted and withdrawn by the use of the tool L. The limitations imposed by the position of tube T on the manipulations required for unclamping, which heretofore existed, have been eliminated. Hence, the length of the gauge can be reduced to a minimum. Also, it can be straightened. Furthermore, with respect to the filler tube T accommodating the gauge, the length of the tube T can be minimized and made much shorter than the height of the automatic transmission M as shown in FIG. 5. In addition, the tube T is not required to have any bent vertical portion. Consequently, the novel tube is equivalent to only the lower portion of the conventional filler tube. In this way the novel tube is simpler in structure than the conventional tube. Additionally, the novel tube can be machined in less steps. Further, it is not necessary that the gauge be flexible.

The invention may be embodied in other specific forms without departing from the spirit or essential characteristics thereof. The present embodiments are therefore to be considered in all respects as illustrative and not restrictive, the scope of the invention being indicated by the appended claims rather than b the foregoing description, and all changes which come within the meaning and range of equivalency of the claims are therefore intended to be embraced therein.

Figure 6A:
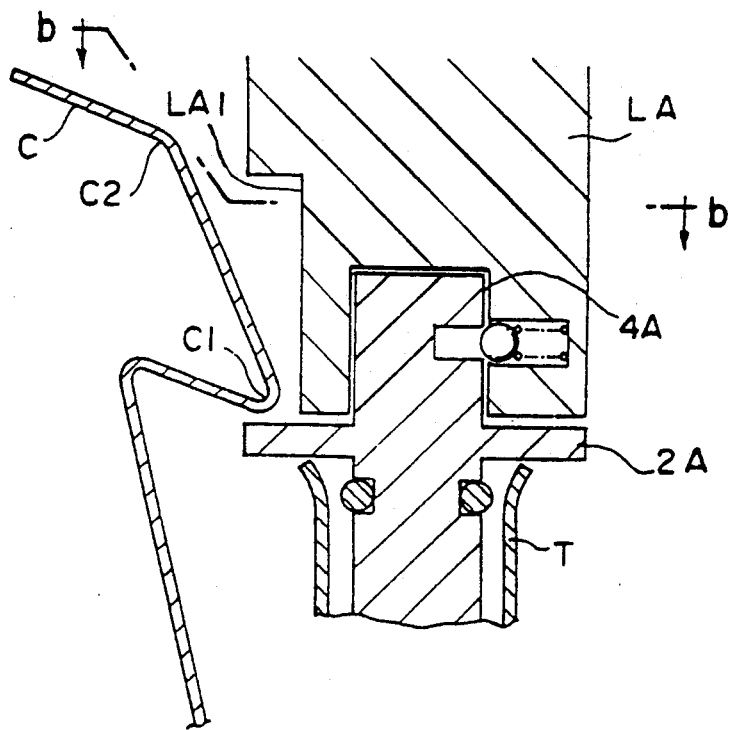
FIG. 6(a) is a vertical cross section of another oil level gauge according to the invention.
Figure 6B:
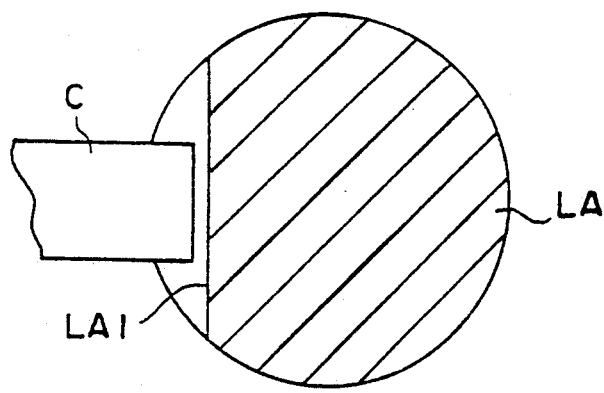
FIG. 6(b) is a horizontal vertical cross section of the gauge shown in FIG. 6(a).

For example, the tool-connecting portion may be shaped into any desired form to conform with the shape of the tool used, though in the above-described embodiment the tool-connecting portion is shaped like a socket so as to mate with a conventional socket wrench. A modified example is shown in FIG. 6(a) and (b), where the front end portion of a tool LA is shaped like a socket having a notch LAI in its outer surface. In this case, the tool-connecting portion 4A is made convex rather than concave. It is to be noted that like components are denoted by like reference numerals in the various figures. Those components which have already been described in connection with the above-described embodiment are not described here. Also, the insertion guide surfaces which make sliding contact with the filler tube are not limited to the outer surfaces of the ribs. They may also be conical surfaces connecting the plug portion with the body of the gauge.

We claim:

1. An elongated liquid level gauge for use in combination with a tube having an open top for receiving the gauge and an open bottom providing access to an engine fluid, the tube being provided with a flexible clamp for holding the gauge within the tube, said gauge comprising:
   a dipstick portion insertable into the tube for contact with the engine fluid;
   a tube cover, having a lower surface fixed to one end of said dipstick portion, for engaging the top of the tube and thereby limiting the extent to which said dipstick portion may be inserted into the tube, said cover having an upper surface engageable by said clamping member;
   tool engaging means extending from said upper surface for engaging a tool for lifting said gauge out of said tube; and
   gauge insertion guide means, carried by said dipstick portion, for engaging the interior of the tube and thereby centering the gauge within the tube.

2. The liquid level gauge of claim 1 further comprising:
   clamp disengaging means fixed to said upper surface for disengaging said clamp from said gauge, responsive to turning the tool engaging means.

3. The liquid level gauge of claim 1 wherein said gauge insertion guide means comprises a plurality of ribs radially extending from said dipstick portion.

4. The liquid level gauge of claim 3 wherein said ribs are fins.

5. The liquid level gauge of claim 3 wherein said ribs are two in number and are mutually perpendicular.

6. The liquid level gauge of claim 2 wherein said tool engaging means is a socket for mating with a socket wrench used as the tool.

7. The liquid level gauge of claim 6 wherein said clamp disengaging means comprises at least one protrusion extending from said socket to approximately the periphery of the cover.

8. The liquid level gauge of claim 7 wherein said socket is in the shape of a box and said one protrusion is a corner of the box.

* * * * *